United States Patent
Chennamsetty et al.

(10) Patent No.: US 10,303,243 B2
(45) Date of Patent: May 28, 2019

(54) CONTROLLING DEVICES BASED ON PHYSICAL GESTURES

(71) Applicant: International Business Machines Corporation, Armonk, NY (US)

(72) Inventors: Ramamohan Chennamsetty, Hopewell Junction, NY (US); Charles K. Davis, III, Denver, CO (US); Christopher R. Dotson, Lexington, KY (US); Charles S. Lingafelt, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 175 days.

(21) Appl. No.: 15/415,940

(22) Filed: Jan. 26, 2017

(65) Prior Publication Data

US 2018/0210543 A1   Jul. 26, 2018

(51) Int. Cl.
*G06F 3/01* (2006.01)
*G06F 3/16* (2006.01)
*A63F 13/00* (2014.01)
*G06F 3/0484* (2013.01)

(52) U.S. Cl.
CPC .............. *G06F 3/011* (2013.01); *A63F 13/00* (2013.01); *G06F 3/013* (2013.01); *G06F 3/017* (2013.01); *G06F 3/04847* (2013.01); *G06F 3/167* (2013.01)

(58) Field of Classification Search
CPC ...... G06F 3/011; G06F 3/017; G06F 3/04847; G06F 3/167
See application file for complete search history.

(56) References Cited

U.S. PATENT DOCUMENTS

| 8,457,353 | B2 | 6/2013 | Reville et al. |
| 8,947,351 | B1 * | 2/2015 | Noble .................... G06F 3/0488 345/156 |
| 2008/0279366 | A1 | 11/2008 | Lindbergh |

(Continued)

FOREIGN PATENT DOCUMENTS

| CN | 202587119 U | 12/2012 |
| CN | 104460972 A | 3/2015 |

OTHER PUBLICATIONS

Inside Samsung Galaxy S4's Face and eye-tracking technology; [online]; [retrieved on Jan. 25, 2017]; retrieved from the Internethttp://www.computerworld.com/article/2495384/smartphones/inside-samsung-galaxy-s4-s-face-and-eye-tracking-technology.html; 5 pages.

(Continued)

*Primary Examiner* — Muhammad N Edun
(74) *Attorney, Agent, or Firm* — Cantor Colburn LLP; Kurt Goudy

(57) ABSTRACT

Embodiments are directed to a computer-implemented method of controlling an electronic device. The method includes detecting, using a processor, a user using one or more sensors. The method further includes selecting one table from a set of tables, wherein each table includes a set of rules to be followed depending on the detecting step. The method further includes measuring changes in a position of the user that are detected by the one or more sensors. The method further includes comparing the changes in the position of the user to one or more rules in the selected table. The method further includes controlling the electronic device based on the comparison.

15 Claims, 4 Drawing Sheets

(56) References Cited

U.S. PATENT DOCUMENTS

| | | |
|---|---|---|
| 2012/0021806 A1 | 1/2012 | Maltz |
| 2014/0225820 A1 | 8/2014 | Schwesinger et al. |
| 2015/0123901 A1 | 5/2015 | Schwesinger et al. |
| 2015/0228118 A1 | 8/2015 | Eade et al. |
| 2015/0247729 A1* | 9/2015 | Meduna ................ H04W 4/027 702/150 |
| 2016/0292881 A1* | 10/2016 | Bose .................. G06K 9/00342 |

OTHER PUBLICATIONS

Nickel et al., "Pointing Gesture Recognition based on 3D-Tracking of Face, Hands and Head Orientation", Proc 5th Int Conf Multimodal Interfaces, Nov. 5-7, 2003, 7 pages.

* cited by examiner

US 10,303,243 B2

CONTROLLING DEVICES BASED ON PHYSICAL GESTURES

BACKGROUND

The embodiments described herein relate in general to the field of computing. More specifically, the embodiments described herein relate to systems and methodologies for controlling a computing device with the use of physical gestures taking into consideration the context (position) of the user.

Current devices are typically controlled with the use of physical controls, such as physical buttons or "soft" buttons on a touch screen. For example, if a user is on a phone call on a mobile phone, the user typically uses the touch screen to adjust settings, mute the call, hang up the call, and the like. Similarly, physical buttons can be used for the same purpose using traditional phones and other telephonic devices.

SUMMARY

Embodiments are directed to a computer-implemented method of controlling an electronic device. The method includes detecting a user using one or more sensors. The method further includes selecting one table from a set of tables. Each table in the set of tables includes a set of rules to be followed depending on the detecting step. Thereafter, changes in the position of the user that are detected by the one or more sensors are measured. The changes in the position of the user are compared to one or more rules in the selected table. The electronic device is then controlled based on the comparison.

Embodiments are further directed to a computer system for controlling an electronic device. The system includes a memory and a processor system communicatively coupled to the memory. The processor is configured to perform a method that includes detecting a user using one or more sensors. The method further includes selecting one table from a set of tables. Each table in the set of tables includes a set of rules to be followed depending on the detecting step. Thereafter, changes in the position of the user that are detected by the one or more sensors are measured. The changes in the position of the user are compared to one or more rules in the selected table. The electronic device is then controlled based on the comparison.

Embodiments are further directed to a computer program product for displaying a presentation. The computer program product includes a computer-readable storage medium having program instructions embodied therewith, wherein the computer-readable storage medium is not a transitory signal per se. The program instructions are readable by a processor system to cause the processor system to perform a method that includes detecting a user using one or more sensors. The method further includes selecting one table from a set of tables. Each table in the set of tables includes a set of rules to be followed depending on the detecting step. Thereafter, changes in the position of the user that are detected by the one or more sensors are measured. The changes in the position of the user are compared to one or more rules in the selected table. The electronic device is then controlled based on the comparison.

Additional features and advantages are realized through techniques described herein. Other embodiments and aspects are described in detail herein. For a better understanding, refer to the description and to the drawings.

BRIEF DESCRIPTION OF THE DRAWINGS

The subject matter that is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
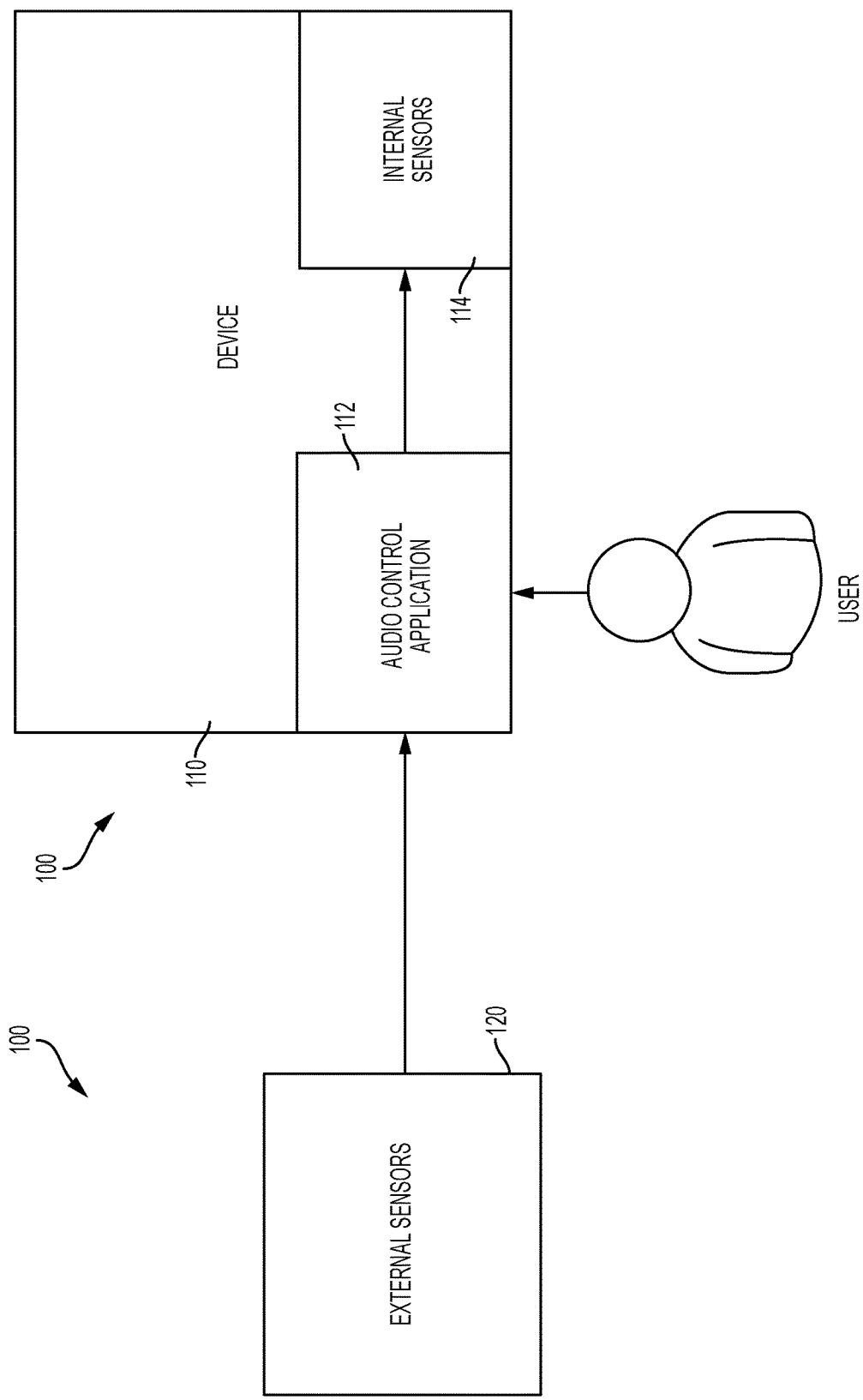
FIG. 1 depicts a block diagram illustrating an exemplary embodiment.

In the accompanying figures and following detailed description of the described embodiments, the various elements illustrated in the figures are provided with three digit reference numbers. The leftmost digits of each reference number corresponds to the figure in which its element is first illustrated.

DETAILED DESCRIPTION

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Additionally, although a detailed description of a computing device is presented, configuration and implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Furthermore, although a detailed description of usage with telephonic devices is included herein, implementation of the teachings recited herein are not limited to embodiments described herein. Rather, embodiments are capable of being implemented in conjunction with any other type of electronic device, now known or later developed.

At least the features and combinations of features described in the immediately present application, including the corresponding features and combinations of features depicted in the figures amount to significantly more than implementing a method of controlling devices based on physical gestures. Additionally, at least the features and combinations of features described in the immediately preceding paragraphs, including the corresponding features and combinations of features depicted in the figures go beyond what is well understood, routine and conventional in the relevant field(s).

As discussed above, there are situations in which a user wants to control an electronic device. Traditional electronic devices can be controlled using a variety of different controls. Physical buttons are often used on electronic devices such as telephones, televisions, audio/visual devices, and the like. Soft buttons, such as those displayed on a touchscreen, are used in devices with touch capabilities, such as telephones, personal digital assistants, tablets, gaming devices, other mobile electronic devices, and the like.

There are a variety of different manners of providing such functionality. Voice-activated controls are used with television remote controls, gaming consoles, computers, and mobile electronic device. However, voice-activated controls are not very useful in certain contexts, such as when a mobile electronic device is being used in a telephonic situation.

There are gesture-based controls on systems such as the Xbox Kinect™. In addition, there are certain devices that use eye tracking to send information. However, there is currently no method or system that allows a user to have customized inputs based on gestures.

Embodiments of the present invention solve the above-described issues by using a novel method and system to allow a user to have customized inputs. A user can adjust the settings of the device such that the device reacts in specific ways to specific movements. Such a customization can allow a user to create a set of gestures that is comfortable for that user. In addition, such a customization can sense characteristics of the user (such as the user's position and location) and customize the set of gestures based on the characteristics.

An exemplary manner in which an embodiment can operate involves a phone call. A variety of different devices can be used to place a phone call, including traditional handsets, conference telephones, video phones, cell phones, smart phones, tablets, computers, and the like. It can be desirable to mute the phone call (or otherwise change the state of an audio input) at certain times, unmute the call at other times, hang up the phone call, change the volume (or otherwise change the state of an audio output), and perform other tasks without need for physically touching the device placing the phone call. Using physical gestures to make those changes can be useful in certain situations and can increase safety in other situations (for example, a person driving a car will not need to physically touch a device in order to operate controls).

Although certain embodiments will be discussed using an example of controlling a phone conversation, it should be understood that other devices can be controlled by embodiments of the present invention. These other devices include (but are not limited to) two-way radios, cooking systems, wearable devices, environmental controls, and the like.

System 100 is an overview of a system that can perform the above-described tasks. System 100 includes an electronic device 110. Electronic device 110 includes an audio control application 112 and a set of internal sensors 114. There are also a set of external sensors 120.

Electronic device 110 can be any type of electronic device. Commonly used electronic devices can include a smart phone, a tablet, a personal digital assistant (PDA), an electronic book reader, a telephone, a conference call phone, a laptop, a personal computer, and the like. In some embodiments, electronic device 110 can be implemented as a computer system 300 (shown in FIG. 3).

Audio control application 112 can include a means to control a microphone and a speaker. The microphone and speaker can be internal to electronic device 110 or can be external and coupled via a wired connection or a wireless connection or combination thereof. The speaker can be a standalone speaker or integrated into a headphone or headset. The microphone can be integrated into a headset, a camera, a camcorder, or a webcam, or can be a standalone device, or the like.

Both the set of internal sensors and the set of external sensors can include a variety of different sensors. Exemplary sensors can include motion sensors, position sensors, pressure sensors, cameras, microphones, wearable sensors, infrared sensors, eye sensors (such as in a pair of glasses in proximity to a user's eyes) and the like.

The set of external sensors 120 can be coupled to electronic device 110 in a variety of different manners. In some embodiments, the set of external sensors 120 can be coupled via a wired connection, such as a universal serial bus (USB) connection, a Lightning connection, a Thunderbolt connection, a Firewire connection, and the like. In some embodiments, the set of external sensors 120 can be coupled via a wireless connection, such as Bluetooth, WiFi, Wireless USB, ANT+, and the like.

Figure 2:
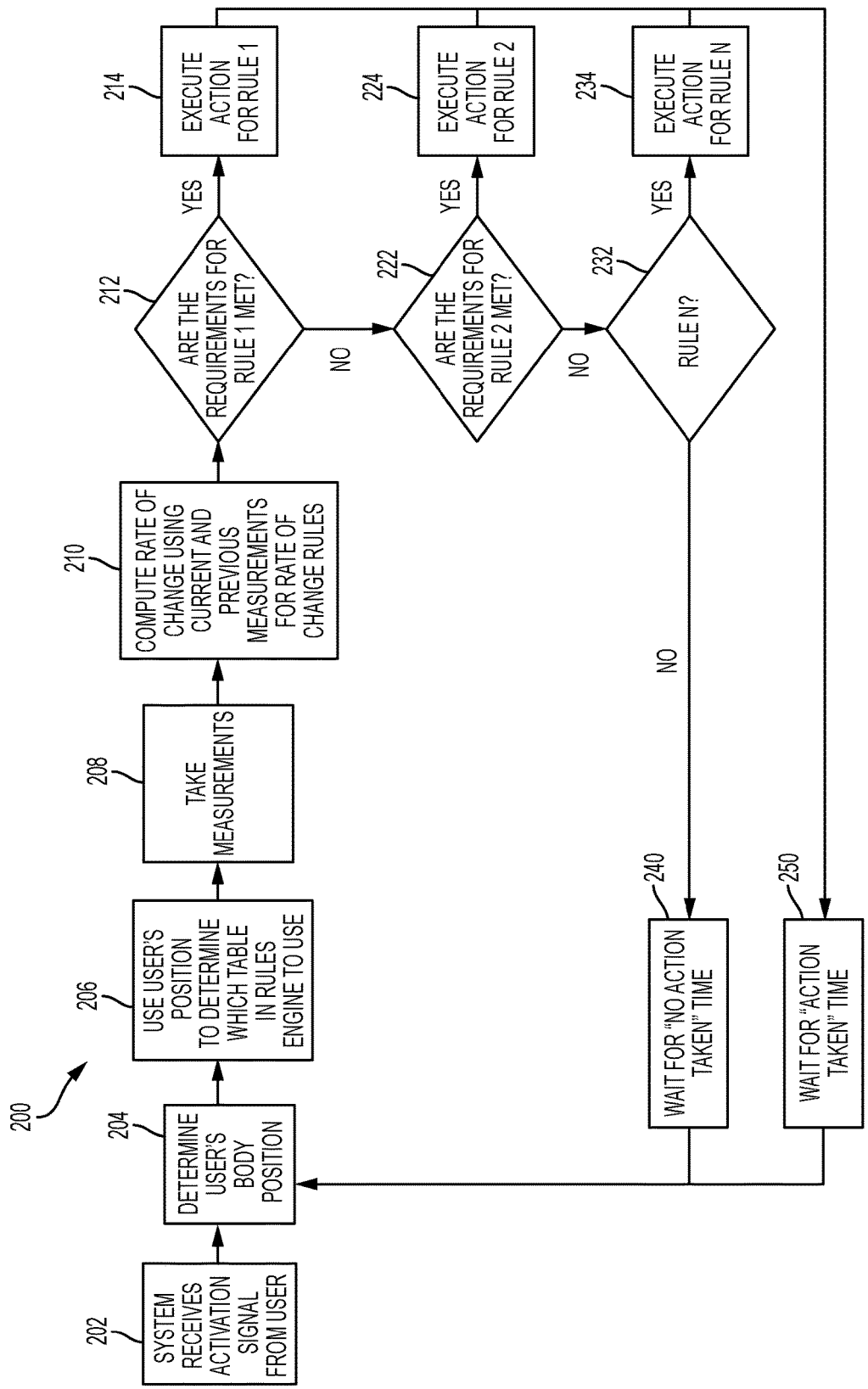
FIG. 2 depicts a flow diagram illustrating the operation of an exemplary embodiment.

Method 200 is an overview of a general method that uses system 100 to accomplish the above-described tasks. A flowchart illustrating a method 200 of implementing such an algorithm is presented in FIG. 2. Method 200 is merely exemplary and is not limited to the embodiments presented herein. Method 200 can be employed in many different embodiments or examples not specifically depicted or described herein. In some embodiments, the procedures, processes, and/or activities of method 200 can be performed in the order presented. In other embodiments, one or more of the procedures, processes, and/or activities of method 200 can be combined or skipped. In some embodiments, portions of method 200 can be implemented by system 100 (FIG. 1).

The system receives an activation signal from a user (block 202). This activation signal can be received in a variety of different manners. In some embodiments, the user can enter a different mode by pressing a button, activating an app, or the like. In some embodiments, the user can use a voice command to activate method 200. In some embodiments, the user can make a gesture that is sensed by a camera or other sensor that is capable of detecting movements or gestures of the user.

The system detects the user's position and/or location (block 204). This can involve determining if the user is standing or sitting or in another position, if there are multiple users in the vicinity of system 100, and the like. These tasks can be performed by analyzing an image from an image capturing device (such as a camera) to detect the position of the user and objects in the user's environment. Block 204 also can involve determining the user's location.

Determining the location of a user can be accomplished in a variety of different manners, both those now known and those developed in the future. Exemplary methods can include the use of global positioning system (GPS) or similar satellite-based navigation system to determine the user's location. WiFi and Bluetooth signals also can be analyzed to determine a user's location. A change in GPS or WiFi signals can be an indication that the user is moving (such as in a car, train, plane, or other moving vehicle). In cases where satellite navigation signals cannot be used, a user can have several pre-set locations (such as his home and his office) and the location can be determined to be at one of the pre-set locations based on WiFi or Bluetooth signals present at that location.

The user's position is then used to determine which table of rules is to be used (block 206). For those skilled in the art, it is recognized that "user's position" is not limited to a user's physical location, but may include environmental or circumstantial position, such as a hot location, or a location within an object, i.e., a plane or specific building, or if the user is tired or has heightened blood pressure or is performing a specific task, i.e., operating a machine, dancing. References to changes of position also can include rate of change of position (velocity) or rate of rate of change of position (acceleration) of the user's body parts that are detected by the sensors. Embodiments of the present invention use one or more tables to establish rules and actions for a variety of different gestures. Each table of the plurality of tables has one or more rules to be followed or actions to be taken for different gestures. In addition, these rules are customizable. One user can have a certain gesture (e.g., raising his hand) meaning one thing (e.g., mute the phone), while another user can have a different gesture (e.g., nodding his head) meaning muting the phone, while yet another user can have the same gesture (raising his hand) mean something completely different (e.g., hang up a phone call).

In addition, a table can provide a priority as to which gesture is processed first. If a user is performing two gestures simultaneously or close in time, the priority can determine which action is taken first.

An exemplary table is provided in Tables 1 through 3. Table 1 (user position is "standing") provides a list of gestures and accompanying actions to be taken for each gesture for when the user is standing. The priority column indicates the rules in order in which they will be tested. Rule 1 indicates that when the user places his palm forward, the talking function of the electronic device is activated (such as from a muted state). Rule 2 is for the user's eye movement. If the user moves his eyes lower than 45 degrees above horizontal, the talking function is activated. If the user moves his eyes higher than 90 degrees, the mute function is activated (a user moving his eyes higher than 45 degrees can indicate that the user is speaking to another person locally rather than speaking to the telephone. An eye position between 45 degrees and 90 degrees can result in no change). Rule 3 is for the user's head position. If the user shakes his head 4 times in a 2-second span, the phone is hung up.

Table 2 (user position is "sitting") provides a list of gestures and accompanying actions to be taken for each gesture for when the user is sitting. Rule 1 is for the user's eye movement. If the user moves his eyes on screen, the talking function is activated. If the user moves his eyes off screen, the mute function is activated. Rule 2 is for the user's head position. If the user shakes his head 4 times in a 2 second span, the phone is hung up.

Table 3 (user position is "in car") provides a list of gestures and accompanying actions to be taken for each gesture for when the user is in an automobile. Rules 1 and 2 are blank, meaning any hand gestures or eye movement is ignored. Rule 3 is for the user's head position. If the user nods his head, the talk function is activated. If the user shakes his head, the mute function is activated.

It should be understood that each of tables 1 through 3 are merely exemplary rules for a given "user position". Actual tables used by an embodiment can be customized by a user. Thus, different gestures can be provided by a user and each gesture can mean something different for different users or even for the same user in different positions (e.g., standing versus sitting). In addition, different use cases can be present for certain users. While tables 1 through 3 illustrate a user who has established a table for standing, sitting, and for in a car, additional use cases can be used by some users. In some embodiments, a user can have fewer than three tables. In some embodiments, a user can have more than three tables. It should be understood that the user can establish a precedence order for selecting the rules tables if more than one "position" condition is true. For example, if a table representing desired actions for the position of "on a conference call" and a second table representing desired actions for the position of "driving in a car" and both of these positions were true, the user may specify that the "driving in a car" rules table take precedence over the "on a conference call" rule table. Note this precedence decision can apply to a complete table or can apply to a rule within a table or some combination.

Additional scenarios also can be programmed into the tables. For example, a user might be sick in bed. In such a situation, the user's position is sensed and different criteria are used. For example, the user's eyes or head might not have to move as much to trigger certain actions.

Rules can include a combination of sensors. For example, a rule might involve a user both looking downward with his eyes at less than 45 degrees and shaking his head. As can be seen in the tables, there can be columns for other functions, such as volume change or calling a specific number (such as an emergency number). Such functions can be useful in certain cases, such as when people are sick, to make it easier to call for help in emergencies.

Referring back to FIG. 2, measurements are taken using one of the plurality of different sensors (block 208). As described with respect to FIG. 1, there can be a variety of sensors in system 100, both internal and external. The sensors described with respect to tables 1 thorough 3 are sensors that detect hand movement, sensors that detect eye movement (also known as gaze detection), and sensors that detect head movement. It should be understood that other types of sensors can be used to track other types of gestures. A motion sensor (such as those on a wearable) can be used to detect movement of a user's body. Hand, eye, and head movement can be tracked through the use of a video imaging unit, such as a camera or a wearable pair of glasses. Various algorithms, both known in the art and those developed in the future, can be used to process video signals in order to determine if movements are those of the hand, eyes, or head. Algorithms also can be used to determine the location of the user based on video input (such as in bed or in a car).

The measurements can be taken at a regular interval, such that a measurement can be compared with a measure performed at previous times. Thereafter, the rate of change or rate of rate of change can be calculated in one of variety of different manners, both those known in the art and those developed in the future (block 210).

Thereafter, each rule of the applicable table is tested in an iterative fashion to determine if any of the rules requirements are met. For example, there may be a situation in which table 1 is found to be the applicable table because the user is standing. Thereafter, rule 1 is examined, determining if the user is placing his palm forward (block 212). This is performed by examining the previously calculated rate of change to determine if certain criteria are met. If so, then the action for rule 1 (placing the electronic device in a speaking mode) is performed (block 214). If not, then rule 2 is examined (block 222). Here, the amount of detected eye movement is compared to the established rule. If the rule is met, then the action for rule 2 is performed (block 224). Otherwise, the next rule is examined. These actions proceed until the last rule N (block 232). If the rule is satisfied, the action for rule N is performed (block 234). Thereafter, a first period of no action occurs (block 250). Otherwise, a second period of no action occurs (block 240), then action proceeds with block 204. The first and second periods of no action can be of any duration. Typically, the period would be a relatively short amount of time, such as one second or less. In some embodiments, the first and second periods of no action can be the same duration. In other embodiments, the first and second periods of no action have different durations.

In addition to the above-described features, there can be automated features present in an embodiment. For example, with respect to a telephonic embodiment, there can be an automatic mute function based on certain conditions. These features can include noise-canceling features. The device can automatically enter a mute mode when keyboard sounds are made. There can be an automatic mute mode to reduce background noises, such that the device has to be activated before it is used. It is use cases such as these where using a gesture to unmute the device can be of most use.

While portions of the above description refer to the control of audio features, it should be understood that audio is only of many items that can be controlled. Many other types of actions can be performed in response to a gesture. Examples include, but are not limited to, call a specific person or phone number. Other actions might be changing video properties (e.g., turning off or on a monitor or TV, turning on or off a camera), changing environmental properties (like mute the TV in the room where the user is located, or stop the noisy ventilation fan).

Figure 3:
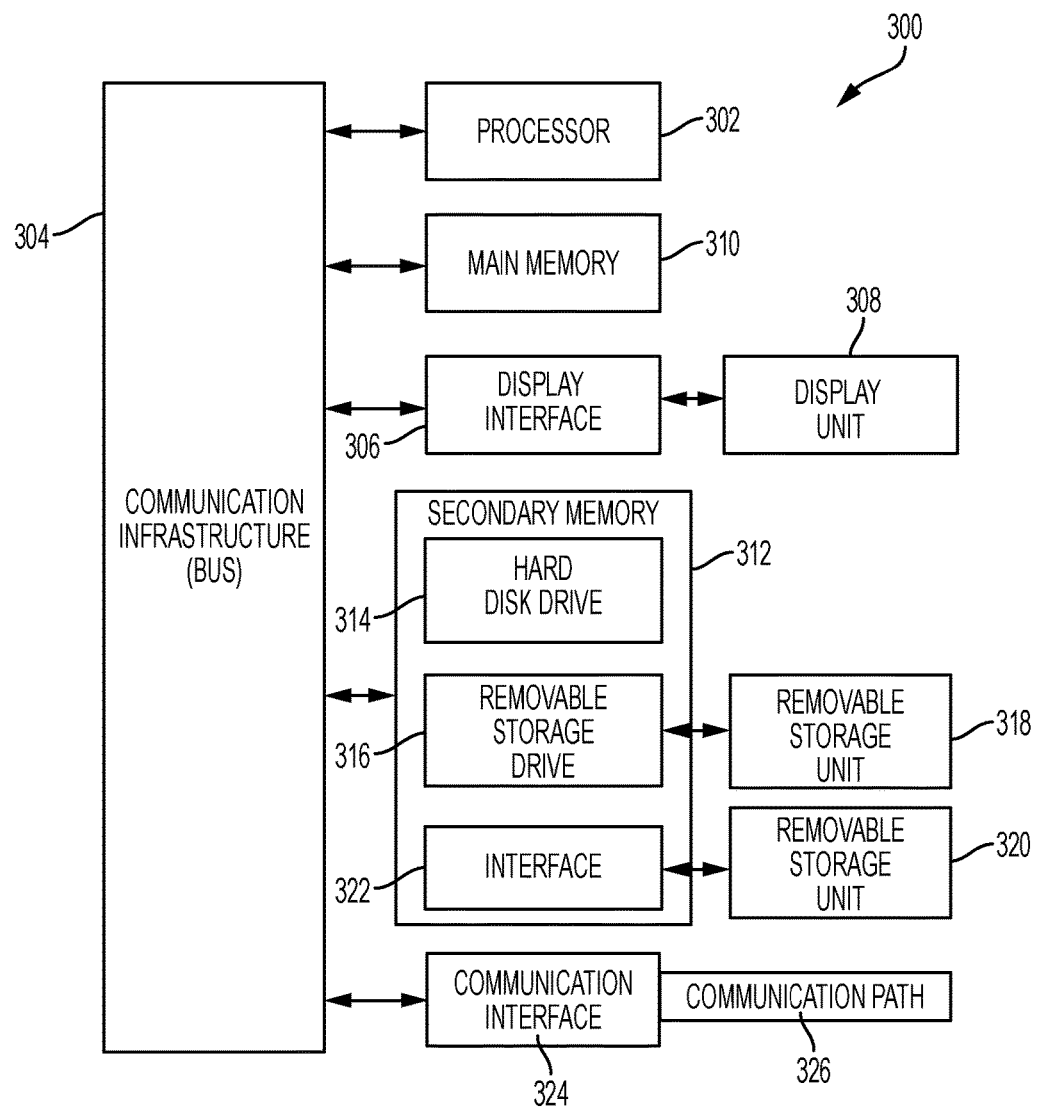
FIG. 3 depicts a computer system capable of implementing hardware components of one or more embodiments.

FIG. 3 depicts a high-level block diagram of a computer system 300, which can be used to implement one or more embodiments. More specifically, computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them. Computer system 300 can have one of a variety of different form factors, such as a desktop computer, a laptop computer, a tablet, an e-reader, a smartphone, a personal digital assistant (PDA), and the like.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the forgoing detailed description that one or more embodiments provide technical benefits and advantages.

Figure 4:
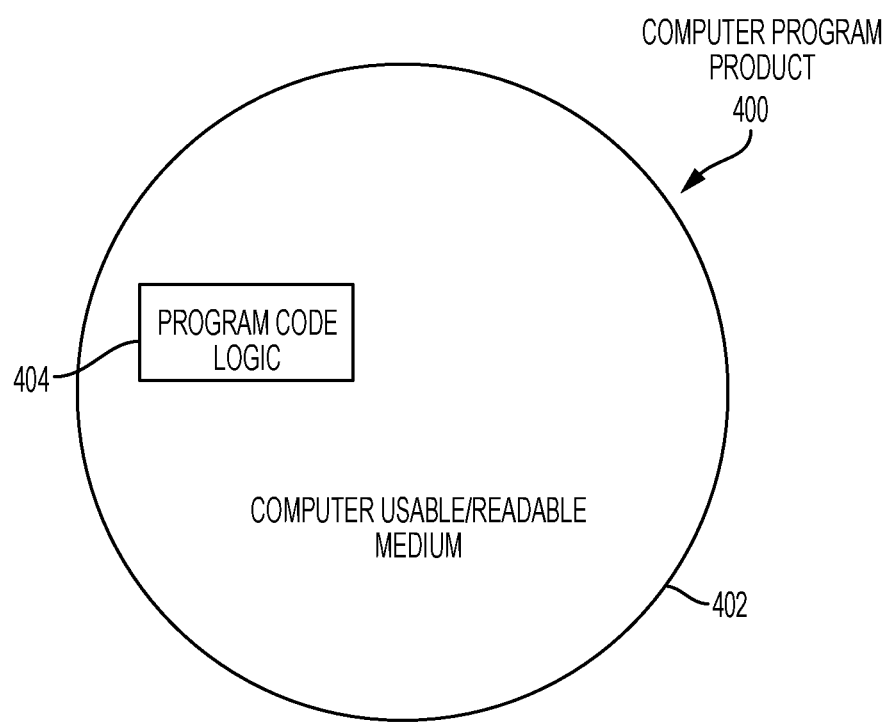
FIG. 4 depicts a diagram of a computer program product according to one or more embodiments.

Referring now to FIG. 4, a computer program product 400 in accordance with an embodiment that includes a computer-readable storage medium 402 and program instructions 404 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the consumer's computer, partly on the consumer's computer, as a stand-alone software package, partly on the consumer's computer and partly on a remote computer or entirely on the remote computer or server. In the latter scenario, the remote computer can be connected to the consumer's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A computer-implemented method of controlling an electronic device, the method comprising:
   detecting, using a processor, a user using one or more sensors,
   wherein detecting the user comprises using the one or more sensors to determine a location of the user, and
   wherein determining the location of the user comprises:
      using the one or more sensors to detect signals from a satellite-based navigation system; and
      calculating the position of the user using the signals from the satellite-based navigation system;
   selecting, using the processor, one table from a set of tables, each table comprising a set of rules to be followed depending on the detecting step;
   measuring, using the processor, changes in a position of the user that are detected by the one or more sensors;
   comparing, using the processor, the changes in the position of the user to one or more rules in the selected table; and
   controlling, using the processor, the electronic device based on the comparison.

2. The computer-implemented method of claim 1, wherein:
   the electronic device includes at least one audio input and one audio output and is capable of voice communication.

3. The computer-implemented method of claim 1, wherein detecting the user comprises using the one or more sensors to determine a position of the user.

4. The computer-implemented method of claim 3, wherein determining the position of the user further comprises:
   determining a rate of change of position of body parts of the user; and
   determining a rate of rate of change of position of body parts of the user.

5. The computer-implemented method of claim 1, wherein;
   each rule in each table of the set of tables comprises an action to be taken for a position change; and
   comparing the changes in the position of the user to one or more rules comprises iterating through each of the one or more rules in a predetermined order to determine if a rule is satisfied.

6. A computer system for controlling an electronic device, the system comprising:
   a memory; and
   a processor system communicatively coupled to the memory;
   the processor system configured to perform a method comprising:
      detecting a user using one or more sensors,
      wherein detecting the user comprises using the one or more sensors to determine a location of the user, and
      wherein determining the location of the user comprises:
         using the one or more sensors to detect signals from a satellite-based navigation system; and
         calculating the position of the user using the signals from the satellite-based navigation system;
      selecting one table from a set of tables, each table comprising a set of rules to be followed depending on the detecting step;
      measuring changes in a position of the user that are detected by the one or more sensors;
      comparing the changes in the position of the user to one or more rules in the selected table; and
      controlling the electronic device based on the comparison.

7. The computer system of claim 6, wherein:
   the electronic device includes at least one audio input and one audio output and is capable of voice communication.

8. The computer system of claim 6, wherein detecting the user comprises using the one or more sensors to determine a position of the user.

9. The computer system of claim 8, wherein determining the position of the user further comprises:
   determining a rate of change of position of body parts of the user; and
   determining a rate of rate of change of position of body parts of the user.

10. The computer system of claim 6, wherein;
    each rule in each table of the set of tables comprises an action to be taken for a position change; and
    comparing the changes in the position of the user to one or more rules comprises iterating through each of the one or more rules in a predetermined order to determine if a rule is satisfied.

11. A computer program product for controlling an electronic device comprising:
    a computer-readable storage medium having program instructions embodied therewith, wherein the computer-readable storage medium is not a transitory signal per se, the program instructions readable by a processor system to cause the processor system to perform a method comprising:
       detecting a user using one or more sensors,
       wherein detecting the user comprises using the one or more sensors to determine a location of the user; and
       wherein determining the location of the user comprises:
          using the one or more sensors to detect signals from a satellite-based navigation system; and
          calculating the position of the user using the signals from the satellite-based navigation system;
       selecting one table from a set of tables, each table comprising a set of rules to be followed depending on the detecting step;
       measuring changes in a position of the user that are detected by the one or more sensors;
       comparing the changes in the position of the user to one or more rules in the selected table; and
       controlling the electronic device based on the comparison.

12. The computer program product of claim 11, wherein:
    the electronic device includes at least one audio input and one audio output and is capable of voice communication.

13. The computer program product of claim 11, wherein detecting the user comprises using the one or more sensors to determine a position of the user.

14. The computer program product of claim 13, wherein determining the position of the user further comprises:
    determining a rate of change of position of body parts of the user; and
    determining a rate of rate of change of position of body parts of the user.

15. The computer program product of claim 11, wherein;
    each rule in each table of the set of tables comprises an action to be taken for a position change; and comparing the changes in the position of the user to one or more rules comprises iterating through each of the one or more rules in a predetermined order to determine if a rule is satisfied.

\* \* \* \* \*